United States Patent [19]
Droual

[11] Patent Number: 6,050,633
[45] Date of Patent: Apr. 18, 2000

[54] VEHICLE SEAT INCLUDING A FOLDAWAY HEADREST, AND A VEHICLE INCLUDING SUCH A SEAT

[75] Inventor: René Droual, Ris-Orangis, France

[73] Assignee: Bertrand Faure Equipements S.A., Boulogne, France

[21] Appl. No.: 09/035,512

[22] Filed: Mar. 5, 1998

[30] Foreign Application Priority Data

Mar. 10, 1997 [FR] France ................................ 97 02801

[51] Int. Cl.[7] .............................. B60N 2/48; B60N 2/36
[52] U.S. Cl. ............................................. 297/61; 297/408
[58] Field of Search .................................. 297/408, 403, 297/61, 391, 378.12, 378.13, 378.14

[56] References Cited

U.S. PATENT DOCUMENTS

| | | | |
|---|---|---|---|
| 4,684,175 | 8/1987 | Trutter | 297/378.13 |
| 5,145,233 | 9/1992 | Nagashima . | |
| 5,582,453 | 12/1996 | Leuchtmann et al. | 297/378.13 |
| 5,669,668 | 9/1997 | Leuchtmann . | |
| 5,681,079 | 10/1997 | Robinson | 297/403 X |
| 5,713,634 | 2/1998 | Koike | 297/216.12 X |
| 5,826,942 | 10/1998 | Sutton et al. | 297/403 X |

FOREIGN PATENT DOCUMENTS

| | | | |
|---|---|---|---|
| 0 471 573 | 2/1992 | European Pat. Off. . | |
| 0 756 964 | 2/1997 | European Pat. Off. . | |
| 2 476 001 | 8/1981 | France . | |
| 2 660 260 | 10/1991 | France . | |
| 2 720 985 | 9/1996 | France . | |
| 398888 | 4/1923 | Germany | 297/15 |
| 33 06 188 | 8/1984 | Germany . | |
| 0128842 | 6/1987 | Japan | 297/403 |
| 0004548 | 1/1989 | Japan | 297/403 |
| 404008310 | 1/1992 | Japan | 297/61 |
| 788410 | 1/1956 | United Kingdom | 297/61 |
| 94/01302 | 1/1994 | WIPO . | |

*Primary Examiner*—Milton Nelson, Jr.
*Assistant Examiner*—David E. Allred
*Attorney, Agent, or Firm*—Marshall, O'Toole, Gerstein, Murray & Borun

[57] ABSTRACT

A motor vehicle seat comprises a seat proper and a seat back which is mounted to pivot between an in-use position and a folded-away position, a first latch holds the seat back in its in-use position, and at least one headrest is pivotally mounted on the seat back to pivot between an in-use position and a folded-away position in which the headrest is tilted forwards, a second latch for preventing the headrest from moving in its in-use position, and a coupling device adapted to displace the headrest into its folded-away position when the seat back is tilted forwards.

11 Claims, 4 Drawing Sheets

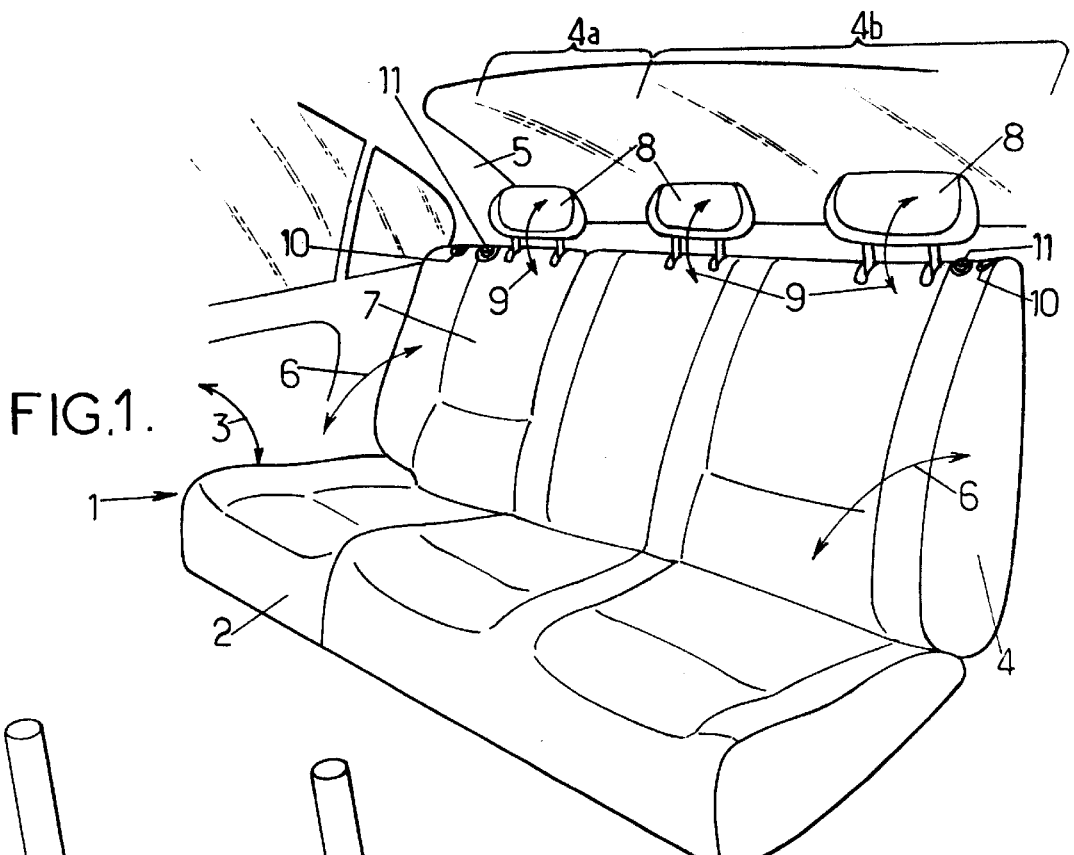
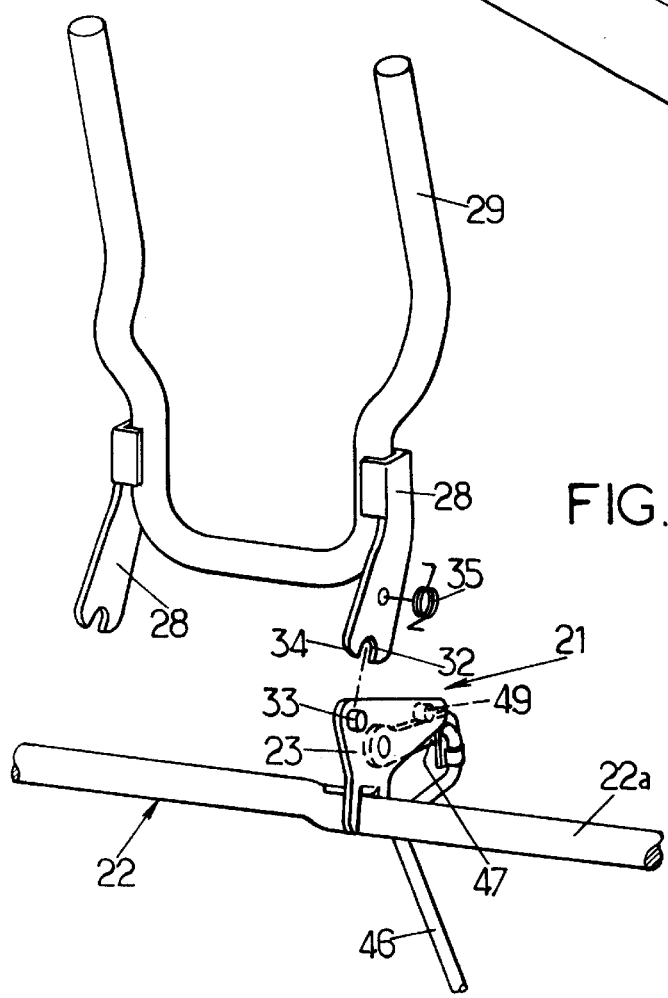

VEHICLE SEAT INCLUDING A FOLDAWAY HEADREST, AND A VEHICLE INCLUDING SUCH A SEAT

FIELD OF THE INVENTION

The present invention relates to vehicle seats that have foldaway headrests, and to vehicles including such seats.

More particularly, the invention relates to a motor vehicle seat comprising:

a seat proper;

a seat back having a forward-facing bearing face and including a framework mounted to pivot between a substantially vertical in-use position and a folded-away position in which said seat back is tilted forwards and substantially horizontally;

a first latch which is mounted on the framework of the seat back and which is movable between an active position where said first latch co-operates with a fixed first locking piece for preventing said seat back from moving when it is in its in-use position, and a folded-away position in which said first latch does not co-operate with the first locking piece, the first latch being urged by first resilient means towards its active position and being capable of being displaced temporarily into its folded-away position by a first control member that is accessible to a user; and at least one headrest that is pivotally mounted on the framework of the seat back to pivot between a substantially vertical in-use position and a folded-away position in which the headrest is tilted forwards, in front of the bearing face of the seat back.

BACKGROUND OF THE INVENTION

Document FR-A-2 476 001 discloses a vehicle back seat of that type in which the headrest is tilted from its in-use position to its folded-away position manually prior to the seat back being tilted down into its folded-away position, thereby reducing the outside dimensions of the seat back.

Thus, in order to tilt the seat back down into its folded-away position, two prior operations are required: firstly the headrest must be folded down manually, and then the first control member needs to be actuated, and that is irksome.

In addition, if the user forgets to fold down the headrest before folding down the seat back, then the headrest is liable to interfere with other elements of the vehicle, in particular with the seat proper of the same seat or with the front seats.

OBJECTS AND SUMMARY OF THE INVENTION

A particular object of the invention is to mitigate those drawbacks.

To this end, the invention provides a vehicle seat of the kind in question which is essentially characterized in that the headrest is continuously urged towards its folded-away position, and where said seat further includes:

a second latch which is mounted on the framework of the seat back and which is movable between an active position in which said second latch co-operates with a second locking piece secured to the headrest to prevent said headrest moving when it is in its in-use position, and a folded-away position in which said second latch does not co-operate with the second locking piece, the second latch being urged by second resilient means towards its active position and being capable of being placed temporarily in its folded-away position by a second control member that is accessible to the user; and a coupling device which is mounted on the framework of the seat back and which co-operates with the second latch to displace said second latch into its folded-away position when the seat back is tilted forwards, such that the headrest is then automatically placed in its folded-away position.

By means of these dispositions, folding down the seat back does not require any prior operation to be performed, i.e. actuating the first control member, while actuating the second control member makes it possible, when so desired, to fold down the headrest on its own so as to improve visibility for the vehicle driver when there is no passenger sitting in the position corresponding to the headrest in question.

In preferred embodiments of the invention, one or more of the following dispositions may optionally be implemented:

the second locking piece includes a notch in which the second latch engages to lock the headrest in its in-use position, said second locking piece further including a camming surface which acts on the second latch, urging it temporarily towards its folded-away position when said second latch is in its active position and the headrest is tilting from its folded-away position towards its in-use position;

safety means are provided to prevent the headrest locking in its in-use position so long as the seat back is not itself again locked in its in-use position: in this way, the headrest remains in its folded-away position, preventing the seat from being used, so long as the seat back is not properly locked in its in-use position, thereby improving safety of the seat in use;

the safety means are adapted to lock the headrest in its folded-away position so long as the seat back is not again locked in its in-use position;

the safety means are constituted by said coupling device which is adapted to hold the second latch in its folded-away position so long as the seat back is not again locked in its in-use position;

the coupling device is movable between a first position in which it acts on the second latch to place it in its folded-away position and a second position in which said coupling device enables the second latch to take up its active position, the coupling device being urged by third resilient means towards its first position and co-operating with a fixed element when the seat back is in its in-use position, said fixed element then placing said coupling device in its second position, and the third resilient means being dimensioned so that, when the coupling device is not placed in its second position by said fixed element, said coupling device exerts a force on the second latch greater than the force exerted thereon by the second resilient means;

the second latch is pivotally mounted on the framework of the seat back to pivot about a first horizontal axis, and the coupling device comprises:

a pusher which is mounted on the framework of the seat back and which is movable between a rest position corresponding to the first position of the coupling device, and an active position corresponding to the second position of the coupling device, said pusher being resiliently urged towards its rest position by a first spring, and said pusher being displaced into its active position by abutment against said fixed element when the seat back is in its in-use position;

a rocker which is pivotally mounted on the framework of the seat back to pivot between first and second positions which correspond respectively to the first and second positions of the coupling device, said rocker having diametrically opposite first and second lever arms, the pusher coming into abutment against the first lever arm by placing the rocker in its second position when said pusher is in its active position, and the rocker being urged towards its first position by a second spring which constitutes said third resilient means;

a link rod hinged to the second lever arm of the rocker; and a link which extends longitudinally between first and second ends, the first end being pivotally mounted on the second latch about a second axis parallel to the first axis in such a manner that the link is capable of tilting between first and second positions corresponding respectively to the first and second positions of the coupling device, the second end of the link being hinged to the link rod, thus being connected to the second lever arm of the rocker, the link further including a bearing zone which is adapted to come into abutment against the second latch, moving it from its folded-away position when said link is in its first position, and said bearing zone not interfering with the second latch when the link is in its second position;

the second latch is adapted to co-operate with the second locking piece to lock the headrest when said second latch is in its folded-away position and the headrest is in its folded-away position;

the second locking piece includes a notch in which the second latch engages to hold the headrest in its folded-away position, said second locking piece further including a camming surface which acts on the second latch, urging it temporarily towards its active position when said second latch is in its folded-away position, and the headrest tilts from its in-use position towards its folded-away position;

the headrest is resiliently urged towards its folded-away position; and the headrest is urged by its own weight towards its folded-away position.

The invention also provides a vehicle whose structure carries at least one seat as defined above, which structure is secured to the first locking part and/or to the fixed element which co-operates with the coupling device to place said coupling device in its second position.

BRIEF DESCRIPTION OF THE DRAWINGS

Other characteristics and advantages of the invention appear from the following description of two embodiments given as non-limiting examples, and with reference to the accompanying drawings.

In the drawings:

FIG. 1 is a perspective view of a seat constituting an embodiment of the invention;

FIG. 5 is a detail view of the headrest locking mechanism and a portion of the coupling device of FIGS. 2 and 3.

MORE DETAILED DESCRIPTION

Figure 2:
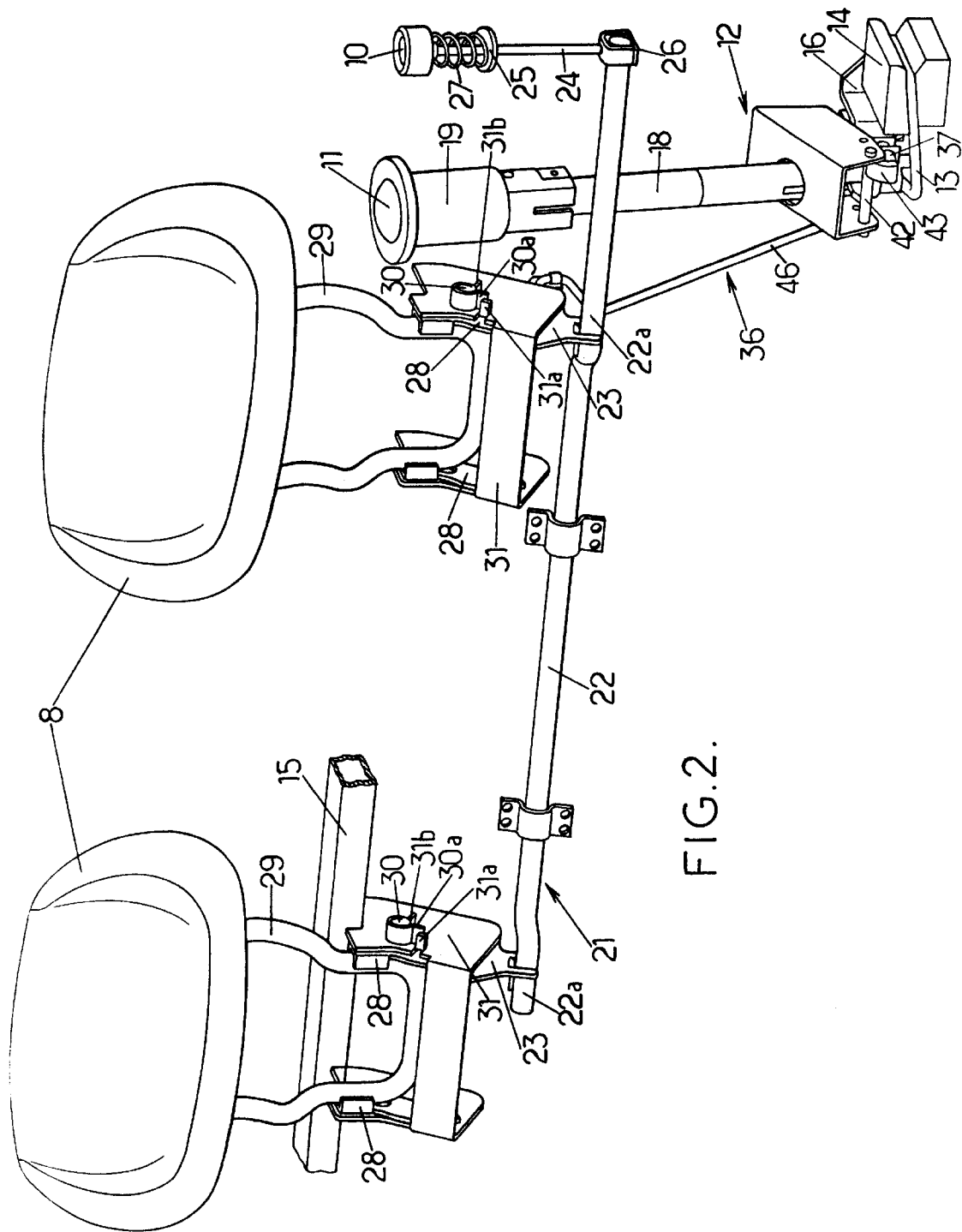
FIG. 2 is a perspective view of the locking mechanisms and of the coupling device of the FIG. 1 seat.

In the various figures, the same references designate elements that are identical or similar.

As shown in FIG. 1, the invention relates more particularly to a back seat 1 of a motor vehicle, which seat presents:

a seat proper 2, optionally being suitable for tilting up forwards, as shown by arrow 3; and a seat back 4 which is pivotally mounted relative to the bodywork 5 of the vehicle, as represented by double-headed arrows 6, the seat back being capable of pivoting either as a single unit, or as two independent portions 4a and 4b.

Thus, the seat back 4, or each independent portion 4a, 4b thereof, can be moved between a substantially vertical in-use position where the bearing face 7 of the back is vertical and faces forwards, and a folded-away position in which said seat back is tilted down forwards into a substantially horizontal position.

In addition, headrests 8, in this case three headrests, are pivotally mounted at the top of the seat back 4, with one of the headrests being mounted on the portion 4a of the seat back while the other two headrests are mounted on the portion 4b.

These headrests pivot individually between firstly a substantially vertical in-use position and secondly a folded-away position in which said headrests are tilted forwards substantially through a right angle relative to the seat back, i.e. to project forwards from the bearing face 7 of the seat back, as shown by double-headed arrows 9.

The headrests 8 are normally held in their in-use position by a locking mechanism, with the headrests or the headrests of a single portion 4a, 4b of the seat being capable of being unlocked by means of a control button 10 specific to said portion 4a or 4b of the seat back.

In addition, each portion 4a, 4b of the seat back is normally held in its in-use position by means of a locking mechanism which can be unlocked by a control button 11 specific to said portion 4a, 4b of the seat back. Actuating the control button 11 of one of the portions 4a, 4b of the seat back also causes the headrest(s) 8 of said portion 4a, 4b of the seat back to be folded away by means of a coupling device which then acts on the locking mechanism for said headrests.

The locking mechanisms and the coupling device are described below in detail with reference to FIGS. 2 to 5 for the portion 4b of the seat back, it being understood that similar mechanisms are provided for the portion 4a of the seat back, with the exception of the portion 4a of the seat back having only one locking mechanism for its single headrest, instead of the two locking mechanisms of the portion 4b.

The headrest locking mechanism 12 is similar to that already disclosed by document FR-A-2 720 985.

Figure 3:
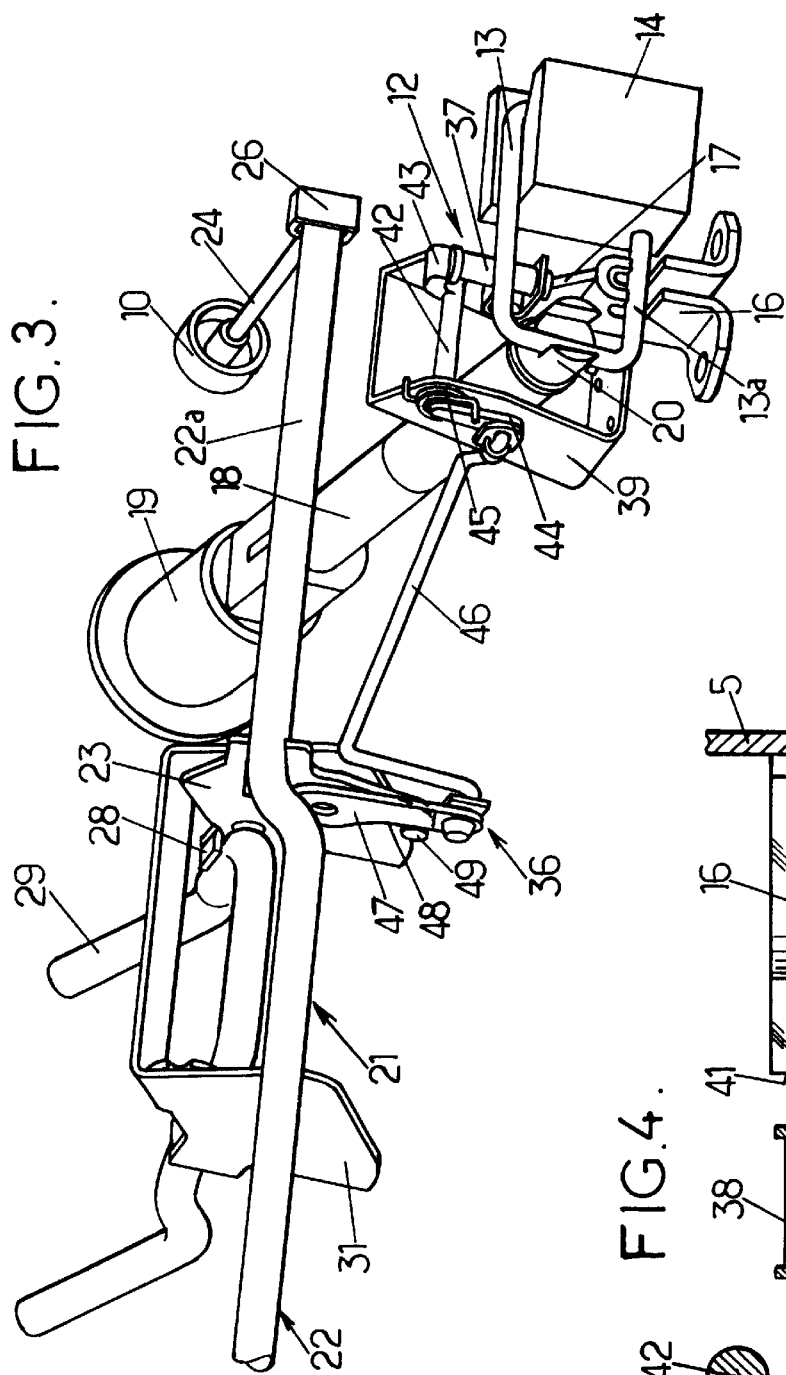
FIG. 3 is a fragmentary view of the elements shown in FIG. 2, seen from beneath and in perspective.
Figure 4:
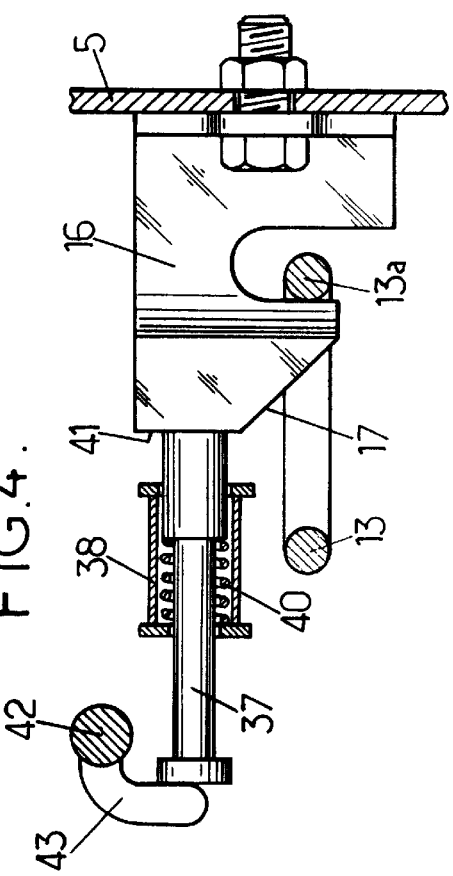
FIG. 4 is a detail view showing the back locking mechanism and a portion of the coupling device of FIGS. 2 and 3.

As can be seen from FIGS. 2 to 4, this locking mechanism 12 comprises:

a bent resilient metal wire 13 having a branch 13a that constitutes the seat back lock and that is mounted on a rigid element 14 secured to the framework 15 of the seat back, which framework is shown in highly diagrammatic and fragmentary manner in FIG. 2, for greater clarity;

a downwardly-open hook 16 that is clearly visible in FIG. 4, said hook 16 being fixed to the bodywork 5 of the vehicle and receiving the branch 13a of the resilient metal wire 13 when it is in an "active" position, said resilient metal wire 13 also being elastically deformable to a folded-away position in which said branch 13a no longer interferes with the hook 16 and therefore no longer prevents the seat back 4 from pivoting, and the hook 16 also includes a camming surface or ramp 17 that faces forwards and downwards to displace the resilient metal wire 13 towards its folded-away position when the seat back 4 is returned to its in-use position after being folded forwards, so that the resilient metal wire 13 can again lock within the hook 16; and the above-mentioned control button 11 which is accessible to a user at the top of the seat back 4, this control button 11 being secured to a rigid control rod 18 which is slidably mounted in a guide 19 fixed to the framework 15 of the seat back and having a bottom fork 20 (FIG. 3) suitable for bearing against the resilient metal wire 13, thereby displacing it into its folded-away position so that actuating the control button 11 serves to release the portion 4b of the seat back to enable it to be tilted forwards.

Also, as shown in detail in FIGS. 2, 3, and 5, the locking mechanism 21 for the two headrests 8 of the seat back portion 4b comprises:

a rigid crank 22 which is pivotally mounted on the framework 15 of the seat back to pivot about a transverse horizontal axis;

two latches 23 each corresponding to a respective headrest 8 and implemented in the form of a pair of vertical metal plates respectively welded to two coaxial lengths 22a of the crank 22, each latch 23 thus being mounted to pivot between an active position in which it locks the corresponding headrest 8 in its in-use position, and a folded-away position in which it does not interfere with pivoting of the headrest;

the above-mentioned control button 10 which is accessible to a user at the top of the seat back and which is secured to a rigid rod 24 mounted to slide vertically in a guide 25 fixed to the framework 15 of the seat back, the bottom end of the rod 24 being connected to one of the lengths 22a of the crank 22, e.g. by means of a yoke 26 surrounding the length 22a in question with clearance, the control button 10 thus enabling the crank 22 to be pivoted, displacing the latches 23 into their folded-away positions;

at least one spring 27 urging the latches 23 towards their active positions, said spring 27 being mounted, for example, between the control button 10 and the guide 25 secured to the framework of the seat back; and two locking pieces 28 co-operating with each of the two latches 23, respectively.

Each of these locking pieces 28 is preferably in the form of a vertical rigid metal plate which is welded to one side of the framework 29 of the headrest in question and which connects said framework 29 via a pivot 30 to a rigid support 31 secured to the framework 15 of the seat back, the headrest support 29 also preferably being connected to the support 31 on its opposite side by means of a similar plate 28, mounted on said support 31 by means of a similar pivot 30.

The pivot 30 may optionally include an abutment finger 30a that is angularly displaceable with the corresponding headrest 8, said abutment finger co-operating with two abutments 31a to 31b that are secured to the support 31 to define the in-use and the folded-away positions of the headrest.

Each locking piece 28 includes a notch 32 suitable for receiving a stud 33 belonging to the corresponding latch 23 to lock the corresponding headrest 8 in the in-use position when the latch 23 is in its active position.

In addition, the locking piece 28 also has a camming surface 34 towards the bottom and towards the front which, when the headrest is raised from its folded-away position to its in-use position, acts on the stud 33 of the corresponding latch 23, temporarily urging said latch towards its folded-away position against bias of the spring 27, until the stud 33 can penetrate into the notch 32 of the locking piece when the headrest is raised into its in-use position.

In addition, the headrests 8 are urged towards their folded-away position under the effect of their own weight and/or under the effect of springs 35 (see FIG. 5) e.g. mounted between one of the plates 28 of each headrest and the support 31 for said headrest in such a manner that the headrests 8 tilt automatically towards their folded-away positions as soon as the locking mechanisms thereof are released.

Finally, as shown in FIGS. 2 to 5, the coupling device 36 includes:

a pusher 37 (FIGS. 3 and 4) slidably mounted in a guide 38 which is itself fixed to a rigid support 39 secured to the framework 15 of the seat back, said pusher being biased by a spring 40 towards a rest position, and said pusher being displaced towards an active position by pressing against an abutment surface 41 of the hook 16 when the portion 4b of the seat back is locked in its in-use position;

a rocker 42 (FIG. 3) pivotally mounted on the support 39 about a transverse horizontal axis to pivot between first and second angular positions, said rocker presenting respectively, in the vicinity of each of its two ends, two diametrically-opposite lever arms 43, 44, the pusher 37 acting on the lever arm 43 to place the rocker 42 in its second position when said pusher is in its active position, while a spring 45 acts on the lever arm 44 to place the rocker 42 in its first position when the pusher 37 is in the rest position;

a rigid link rod 46 (FIG. 3) hinged to the end of the lever arm 44 of the rocker; and a rigid link 47 (FIGS. 3 and 5) which extends longitudinally between first and second ends, its first end being pivotally mounted on one of the latches 23 above a transverse horizontal axis, and its second end being hinged to the link rod 46.

The link 47 can thus tilt between first and second angular positions respectively corresponding to the first and second angular positions of the rocker 42.

In addition, the link also includes an intermediate bearing zone 48 adapted to come into upwards abutment against a stud 49 of the corresponding latch 23, the link 47 and the stud 49 being disposed so that said link entrains and holds both latches 23 in their folded-away position under drive from the spring 45 (which applies a force on the latches 23 that is greater than the force applied by the spring 27) when said link is in its first position, i.e. when the portion 4b of the seat back is not locked in its in-use position.

In contrast, the link 47 does not interfere with the stud 49 when the link is in its second position.

Thus, the coupling device 36 automatically unlocks the headrests 8 as soon as the portion 4b of the seat back is unlocked, and thereafter it holds the headrest latches 23 in the folded-away position until the portion 4b is again locked in the in-use position.

Figure 6:
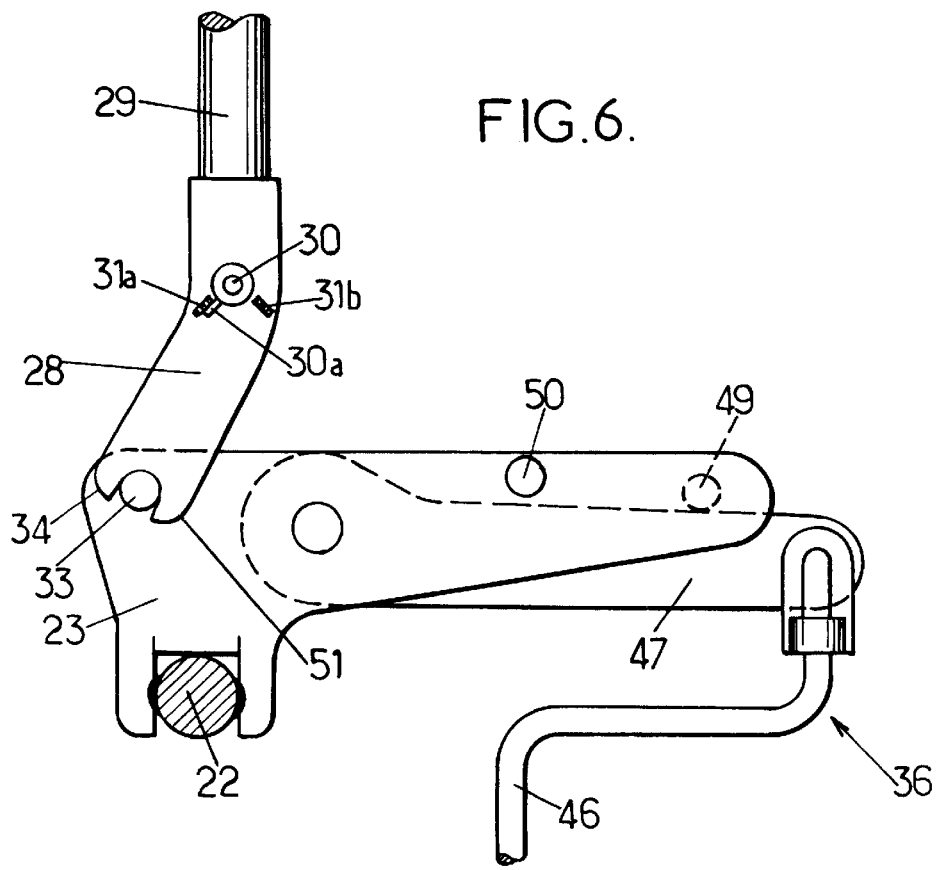
FIGS. 6 and 7 are detail views showing the headrest locking mechanism and a portion of the coupling device constituting a variant of the device shown in FIGS. 2 and 3.
Figure 7:
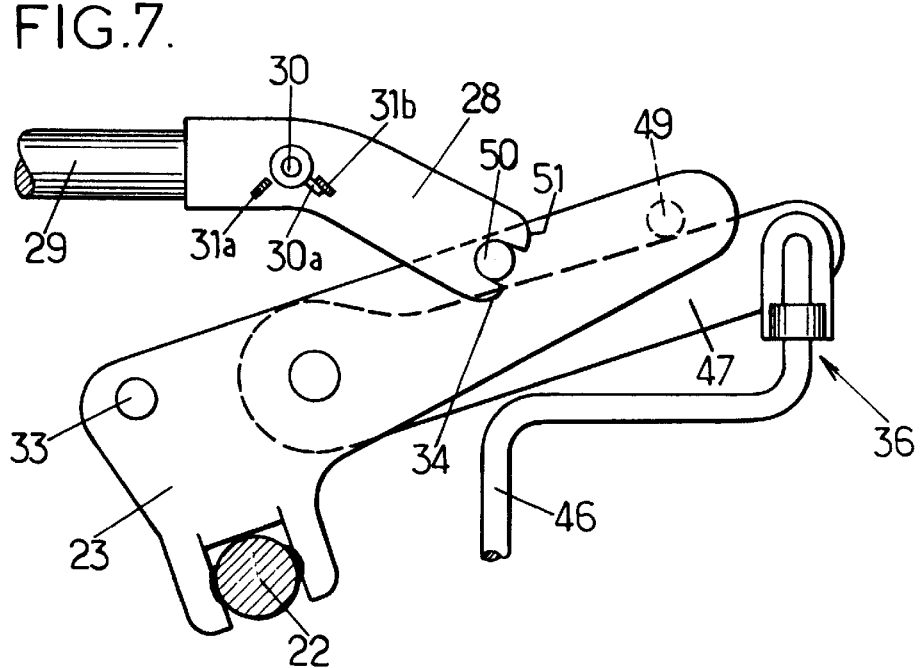

In a variant, as shown in FIGS. 6 and 7, each latch 23 may further include an additional stud 50 disposed to engage in the notch 32 of the corresponding plate 28 when said latch 23 is held in the folded-away position by the coupling device 36, in such a manner as to then lock the headrests 8 in the folded-away position so long as the portion 4b of the seat back is not locked again in its in-use position.

In which case, the plate 28 also has going downwards and rearwards: a second camming surface 51 adapted to urge the latch 23 temporarily towards its active position while the headrest is pivoting towards its folded-away position and the latch 23 is already in its folded-away position.

I claim:

1. A motor vehicle seat, comprising:

a seat proper mounted on a vehicle body;

a seat back having a forward-facing bearing face and including a framework pivotally mounted to the vehicle body between a substantially vertical in-use position and a folded-away position in which said seat back is tilted forwards and substantially horizontally;

a first latch which is mounted on the framework of the seat back and which is movable between an active position where said first latch engages with a fixed first locking piece which is fixed to the vehicle body for preventing said seat back from moving when it is in its in-use position, and a folded-away position in which said first latch does not engage with the first locking piece, the first latch being urged by first resilient means toward its active position;

a first control member which is mounted on the framework of the seat back and which is actuable by a user for displacing temporarily said first latch into its folded-away position; and at least one headrest that is pivotally mounted on the framework of the seat back to pivot between a substantially vertical in-use position and a folded-away position in which the headrest is tilted forwards, in front of the bearing face of the seat back;

wherein the headrest is resiliently biased towards its folded-away position; and wherein said seat further includes:

a second latch which is mounted on the framework of the seat back and which is movable between an active position in which said second latch engages with a second locking piece secured to the headrest to prevent said headrest from moving when it is in its in-use position, and a folded-away position, in which said second latch does not engage with the second locking piece, the second latch being urged by second resilient means towards its active position;

a second control member which is mounted on the seat back framework and which is actuable by the user for placing temporarily said second latch in its folded-away position; and a coupling device which is mounted on the framework of the seat back and which engages with the second latch to displace said second latch into its folded-away position when the seat back is tilted forwards, such that the headrest is then automatically placed in its folded-away position.

2. A seat according to claim 1, in which the second locking piece includes a notch in which the second latch engages to lock the headrest in its in-use position, said second locking piece further including a camming surface which acts on the second latch, urging it temporarily towards its folded-away position when said second latch is in its active position and the headrest is tilting from its folded-away position towards its in-use position.

3. A seat according to claim 1, in which said coupling device is adapted to hold the second latch in its folded-away position so long as the seat back is not again locked in its in-use position.

4. A seat according to claim 1, in which the coupling device is movable between a first position in which it acts on the second latch to place it in its folded-away position and a second position in which said coupling device enables the second latch to take up its active position, the coupling device being urged by third resilient means towards its first position and engaging with a fixed element which is rigid with the vehicle body when the seat back is in its in-use position, said fixed element then placing said coupling device in its second position, and the third resilient means being dimensioned so that, when the coupling device is not placed in its second position by said fixed element, said coupling device exerts a force on the second latch greater than the force exerted thereon by the second resilient means.

5. A seat according to claim 4, in which the second latch is pivotally mounted on the framework of the seat back to pivot about a first horizontal axis, and the coupling device comprises:

a pusher which is mounted on the framework of the seat back and which is movable between a rest position corresponding to the first position of the coupling device, and an active position corresponding to the second position of the coupling device, said pusher being resiliently urged towards its rest position by a first spring, and said pusher being displaced into its active position by abutment against said fixed element when the seat back is in its in-use position;

a rocker which is pivotally mounted on the framework of the seat back to pivot between first and second positions which correspond respectively to the first and second positions of the coupling device, said rocker having diametrically opposite first and second lever arms, the pusher coming into abutment against the first lever arm by placing the rocker in its second position when said pusher is in its active position, and the rocker being urged towards its first position by a second spring which constitutes said third resilient means;

a link rod hinged to the second lever arm of the rocker; and a link having first and second ends, the first end being pivotally mounted on the second latch about a second axis parallel to the first axis in such a manner that the link is capable of tilting between first and second positions corresponding respectively to the first and second positions of the coupling device, the second end of the link being hinged to the link rod, thus being connected to the second lever arm of the rocker, the link further including a bearing zone which is adapted to come into abutment against the second latch, moving it from its folded-away position when said link is in its first position, and said bearing zone not interfering with the second latch when the link is in its second position.

6. A seat according to claim 4, in which the second latch engages with the second locking piece to lock the headrest when said second latch is in its folded-away position and the headrest is in its folded-away position.

7. A vehicle comprising a structure carrying at least one seat according to claim 4, which structure is secured to the fixed element which is engaged by the coupling device to place said coupling device in its second position.

8. A seat according to claim 6, in which the second locking piece includes a notch in which the second latch engages to hold the headrest in its folded-away position, said second locking piece further including a camming surface which acts on the second latch, urging it temporarily towards its active position when said second latch is in its folded-away position, and the headrest tilts from its in-use position towards its folded-away position.

9. A seat according to claim 1, in which the headrest is resiliently urged towards its folded-away position.

10. A seat according to claim 1, in which the headrest is urged by its own weight towards its folded-away position.

11. A vehicle comprising a structure carrying at least one seat according to claim 1, which structure is secured to the first locking piece.

* * * * *